United States Patent
Braas

[15] 3,646,958
[45] Mar. 7, 1972

[54] QUICK-ACTING VALVE WITH ROCKER-TYPE OPERATING BUTTON

[72] Inventor: Alfred Braas, Dillenburg, Germany

[73] Assignee: Armaturenwerk Niederscheld GmbH, Dillenburg/Hessen, Germany

[22] Filed: Sept. 22, 1969

[21] Appl. No.: 859,647

[52] U.S. Cl. ............................137/553, 251/77, 200/167, 74/100
[51] Int. Cl. .................................F16k 37/00, F16k 31/44
[58] Field of Search ............... 200/167; 74/100, 97; 251/75, 251/77, 78, 84, 86, 262, 263, 295; 137/553, 556

[56] References Cited

UNITED STATES PATENTS

| 3,166,500 | 1/1965 | Noakes et al. | 251/77 X |
| 1,264,282 | 4/1918 | Dearing | 137/553 |
| 2,496,638 | 2/1950 | Ray | 137/553 X |
| 3,389,886 | 6/1968 | Tissot-Dupont | 251/77 X |
| 2,942,622 | 6/1960 | Hahn et al. | 251/263 X |
| 1,988,956 | 1/1935 | Newell | 251/75 |
| 1,990,747 | 2/1935 | Netschert | 251/75 X |
| 2,055,133 | 9/1936 | Newell | 251/75 X |

FOREIGN PATENTS OR APPLICATIONS

| 1,280,281 | 11/1961 | France | 251/77 |

*Primary Examiner*—Henry T. Klinksiek
*Attorney*—Flynn & Frishauf

[57] ABSTRACT

A spring, preferably additionally connected to a ball, is interposed in the motion transfer mechanism from a rocker-type operating button to the valve element of a quick-acting valve, the spring compensating for overtravel during operation and for manufacturing tolerances, to effect tight seating of the valve element while permitting rapid operation of the valve element.

3 Claims, 4 Drawing Figures

ALFRED BRAAS,
Inventor

QUICK-ACTING VALVE WITH ROCKER-TYPE OPERATING BUTTON

This invention relates to a quick-acting valve having a rocker-type operating button whose extreme positions determine the open and closed position of the valve, said rocker-type operating button being provided with a cam which acts upon the valve body through a thrustpiece. These valves are useful in flow systems which require blocking devices enabling rapid closing.

In the case of a known quick-acting valve of the above-described type a member is moved in its axial direction to operate the closing member itself. The tilting operating button has direct action on the valve disk through a cam and the intermediary member. The differences existing between the dimensions of the component parts due to manufacturing tolerances may result in poor cooperation between the tilting operating button and the valve disk. The manufacturing tolerances of the power transmission consisting of rigid intermediary members may also, during the closing operation give rise to a canting of the valve disk on the valve seat, thus substantially reducing the blocking effect of the valve.

SUBJECT MATTER OF THE PRESENT INVENTION

A flexible element is provided for the trip cam to act upon a spring-loaded valve body. Preferably, a ball is positioned between the trip cam and the thrustpiece said ball causing an even transmission of power between the two component parts. The trip cam now only acts indirectly on the valve disk through the ball, the resilient element, (formed, for example by a cup spring) and a member. Canting of the valve disk is avoided. One or more cup springs may be provided, the springs pressing the valve disk against the valve seat with even pressure. They can absorb any excess lift upon the closing of the valve while compensating for manufacturing tolerances as well. Preferably the operating button is formed with a window through which a position indicator is visible showing the position of the valve, i.e., whether open or closed.

Referring to the accompanying drawings.

Figure 1:
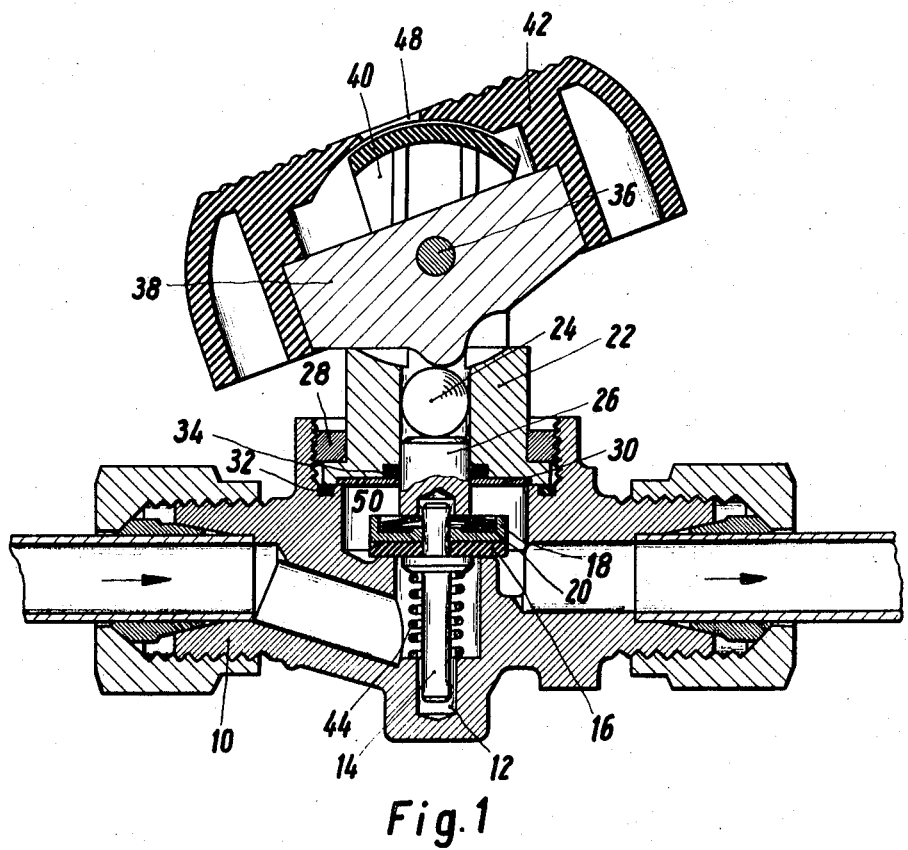
FIG. 1 is a longitudinal section of a quick-acting valve in closed position.
Figure 2:
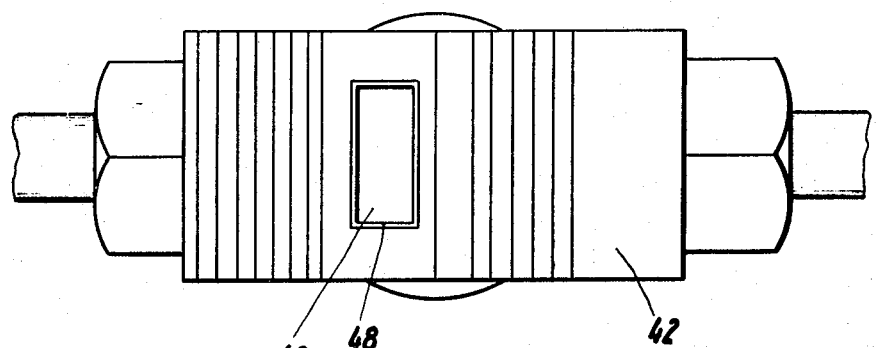
FIG. 2 is a plan view of the valve, the window, and the position indicator in closed position.
Figure 3:
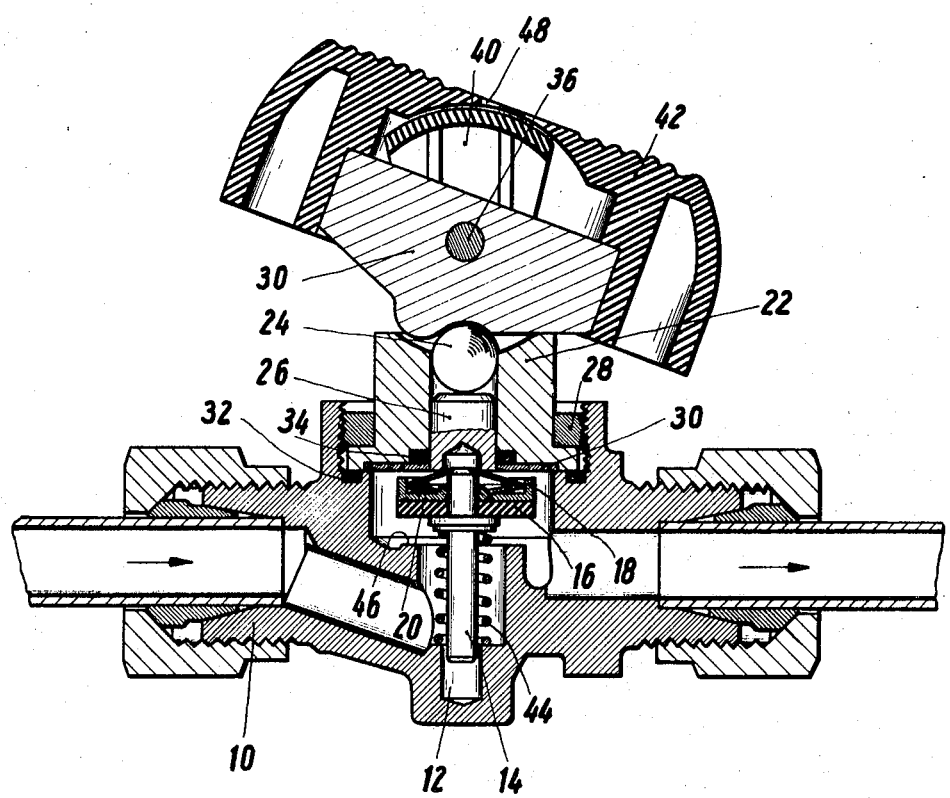
FIG. 3 is a longitudinal section of the quick-acting valve in open position.
Figure 4:
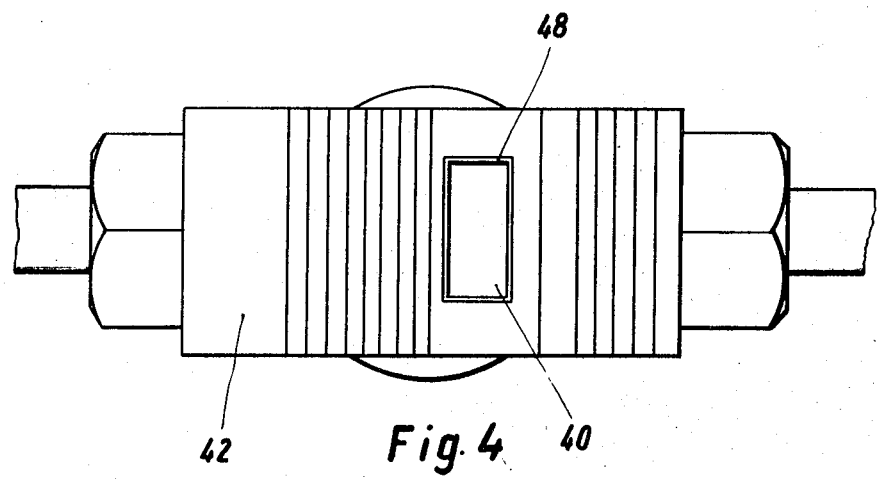
FIG. 4 is a plan view of the quick-acting valve, the window, and the position indicator in open position.

Fluid flows through valve body 10 of the quick-acting valve in the direction indicated by the arrows. Valve body 10 is provided with a vertical bore 12 enclosing a valve disk 16 and provide a guide bore for valve disk 16 and valve disk guide stem 14. A cup spring-receiving member 18 abuts the valve disk 16. One or more elastic members in the form of cup springs 20 are disposed in the recess on the upper face of disk spring-receiving member 18. In closed position of the quick-acting valve the elastic cup springs 20 cause the valve disk 16 to evenly abut valve seat 46 (FIGS. 1 and 3). A thrustpiece 26 is seated with its bottom surface on the cup springs 20, which bear against receiving member 18. Thrustpiece 26 is formed with a concentric recess into which valve disk guide 14 fits with axial and radial clearance.

The deformable cup springs 20 balance clearances between thrustpiece 26 and valve disk guide 14.

A spring 44 coaxially encloses valve spring guide 14 and is supported by the bottom surface of a valve chamber 50 and by a stop member of the valve spring guide 14. In the open position spring 44 lifts valve disk 16 from valve seat 46 (see FIG. 3). The upper part of valve chamber 50 which is set off against its lower part has a larger diameter than the lower part.

A closing member 22 limits valve chamber 50 upwardly, containing thrustpiece 26 and ball 24 in a concentric bore. A disk 30 and a O-ring 32 seal valve chamber 50 off against closing member 22. A second O-ring 34 disposed in the concentric guide of closing member 22 seals piece 26. Closing part 22 is coupled with valve body 10 through a nut 28.

When a rocker-type operating button 42 is in its closed position, a trip cam 38 causes ball 24, which moves thrustpiece 26 downwardly against the pressure of spring 44, to move in a downward direction, while valve disk 16 closes valve seat 46. Rocker-type operating button 42, trip cam 38 and a position indicator 40 are tiltably arranged on a bearing pin 36. Trip cam 38 is formed with an overcenter projection, to hold it in either on or off position.

A window 48 provided in the rocker-type operating button 42 permits the position of the indicator 40 to be visually indicated.

In the open-position, spring 44 urges ball 24 into a recess of trip cam 38 thus lifting valve disk 16 connected with valve disk guide 14 from valve seat 46.

I claim:

1. Quick-acting two-position valve having a rocker-type snap-action operating button whose one position determines the open condition and whose other position determines the closed condition of the valve, comprising
   a valve housing (10);
   a valve seat (46) in the housing;
   a valve body (16) movable in the housing;
   a guide pin (14) guiding movement of the valve body (16) in the housing between positions where the valve body is lifted off the valve seat and where the valve body contacts the valve seat;
   a cam (38) formed with an overcenter position secured to the operating button, the operating button being secured to the valve housing for rocking motion, with the cam facing in the direction of the valve body (16);
   a motion transfer means interconnecting the cam (38) of the operating button and said valve body including a disk-shaped element (18) acting on the valve body (16), a ball (24) in engagement with the cam, and a cylindrical thrust transfer element (26) in engagement with the ball; and at least one cup spring (20) bearing on the disk-shaped element (18) with one side thereof, surrounding the guide pin, and located to be interposed between the cylindrical thrust transfer element to provide for transfer of motion from the cam, upon rocking of the operating button, to the valve body and permitting travel of the cam past the overcenter position and snap-action of the operating button, the operating button being formed with a window (48); and
   a position indicator (40) stationary in the housing, is located in the housing to be visible through the window.

2. Valve according to claim 1, wherein the cylindrical thrust element (26) is formed with a central bore of larger diameter than the diameter of the valve body guide pin (14) and the valve body guide pin extends into the bore with radial and axial clearance.

3. Valve according to claim 1, wherein the motion transfer means further includes a ball (24) and a cylindrical thrust transfer element (26), one end surface of the thrust transfer element bearing against at least one cup spring (20), the ball being arranged between the cam (38) and the other end surface of the thrust transfer element.

* * * * *